United States Patent
Arnold et al.

(10) Patent No.: US 9,707,844 B2
(45) Date of Patent: Jul. 18, 2017

(54) GENERATOR FOR TRUCK REFRIGERATION UNIT

(75) Inventors: Brian R. Arnold, Lakeland, FL (US); Michael A. Quill, Dunedin, FL (US); Michael R. Hartnett, Clearwater, FL (US)

(73) Assignee: Emerald Technology Partners, LLC., Clearwater, FL (US)

( * ) Notice: Subject to any disclaimer, the term of this patent is extended or adjusted under 35 U.S.C. 154(b) by 1203 days.

(21) Appl. No.: 13/581,803

(22) PCT Filed: Oct. 1, 2011

(86) PCT No.: PCT/US2011/054474
§ 371 (c)(1),
(2), (4) Date: Aug. 30, 2012

(87) PCT Pub. No.: WO2012/045056
PCT Pub. Date: Apr. 5, 2012

(65) Prior Publication Data
US 2012/0319472 A1      Dec. 20, 2012

Related U.S. Application Data

(60) Provisional application No. 61/389,093, filed on Oct. 1, 2010, provisional application No. 61/484,805, filed on May 11, 2011, provisional application No. 61/526,763, filed on Aug. 24, 2011.

(51) Int. Cl.
*B60L 1/00* (2006.01)
*B60L 3/00* (2006.01)
*H02G 3/00* (2006.01)
*B60K 25/08* (2006.01)

(52) U.S. Cl.
CPC ....... *B60K 25/08* (2013.01); *B60W 2300/126* (2013.01); *Y02T 10/90* (2013.01)

(58) Field of Classification Search
CPC .................................. B60K 25/08; B60P 3/20
See application file for complete search history.

(56) References Cited

U.S. PATENT DOCUMENTS

| 2,268,667 A | 1/1942 | Mendez |
| 2,630,687 A | 3/1953 | Acton |
| 2,669,098 A | 2/1954 | Buell |

(Continued)

FOREIGN PATENT DOCUMENTS

GB         2305408 A  *  4/1997  ................ B60P 3/36

*Primary Examiner* — Carlos Amaya
(74) *Attorney, Agent, or Firm* — Inventions International Inc.; Tiffany C. Miller

(57) ABSTRACT

A refrigeration system can include an electrical generator coupled to a mechanical interface, the mechanical interface configured to transfer mechanical energy from a vehicle to the electrical generator, and a control module connected to the electrical generator via electrical wiring. The refrigeration system can also include an electrically-driven refrigeration unit coupled to the control module, and a battery coupled to the control module via electrical wiring. The control module can be adapted to provide electrical power to the refrigeration unit from the electrical generator or the battery and is further adapted to charge the battery with electrical energy not needed for operating the refrigeration unit.

2 Claims, 6 Drawing Sheets

(56) References Cited

U.S. PATENT DOCUMENTS

| | | | |
|---|---|---|---|
| 2,883,611 A | 4/1959 | Fuge | |
| 3,315,474 A | 4/1967 | Farer | |
| 3,866,433 A | 2/1975 | Krug | |
| 4,165,466 A | 8/1979 | Stikkers | |
| 4,314,160 A | 2/1982 | Boodman et al. | |
| 4,405,872 A | 9/1983 | Thomas | |
| 4,496,016 A * | 1/1985 | Unsworth | B60K 25/08 105/27 |
| 4,504,761 A | 3/1985 | Triplett | |
| 4,536,668 A | 8/1985 | Boyer | |
| 4,539,496 A | 9/1985 | Thomas et al. | |
| 4,539,497 A | 9/1985 | Boyer | |
| 4,657,289 A | 4/1987 | Boyer | |
| 4,761,577 A | 8/1988 | Thomas et al. | |
| 4,838,753 A | 6/1989 | Gehman et al. | |
| 4,980,572 A | 12/1990 | Sen | |
| 5,265,435 A * | 11/1993 | Richardson | B60H 1/3225 62/133 |
| 6,742,343 B2 | 6/2004 | Matonog et al. | |
| 6,742,386 B1 | 6/2004 | Larson | |
| 6,805,000 B1 | 10/2004 | Sheikh-Bahaie | |
| 7,001,053 B1 | 2/2006 | Chieh et al. | |
| 7,132,939 B2 | 11/2006 | Tyndall et al. | |
| 7,259,469 B2 | 8/2007 | Brummett et al. | |
| 7,403,103 B2 | 7/2008 | Pearman | |
| 7,429,801 B2 | 9/2008 | Adamson et al. | |
| 7,514,803 B2 | 4/2009 | Wilks | |
| 7,547,980 B2 | 6/2009 | Harrison | |
| 8,723,344 B1 * | 5/2014 | Dierickx | F03G 7/08 290/1 R |
| 8,935,933 B1 * | 1/2015 | Koelsch | B60H 1/00428 62/115 |
| 2003/0019674 A1 | 1/2003 | Duan | |
| 2004/0124023 A1 * | 7/2004 | Plishner | B60G 17/0157 180/170 |
| 2007/0052241 A1 | 3/2007 | Pacy | |
| 2007/0089924 A1 | 4/2007 | De La Torre et al. | |
| 2007/0170791 A1 | 7/2007 | Hargett | |
| 2007/0209378 A1 | 9/2007 | Larson | |
| 2010/0154449 A1 * | 6/2010 | Stover, Jr. | B60H 1/00364 62/236 |
| 2011/0031051 A1 * | 2/2011 | George | B60L 11/12 180/65.31 |

* cited by examiner

GENERATOR FOR TRUCK REFRIGERATION UNIT

This application claims the benefit of U.S. Provisional Application No. 61/389,093, entitled "Generator for Truck Refrigeration Unit", filed on Oct. 1, 2010; U.S. Provisional Application No. 61/484,805, entitled "Kinetic Energy Converter System", filed on May 11, 2011; and U.S. Provisional Application No. 61/526,763, entitled "Refrigeration System", filed on Aug. 24, 2011, each of which is incorporated herein by reference in its entirety.

Embodiments relate generally to a refrigeration system and, more particularly, to a refrigeration system that is powered by electrical energy generated by mechanical motion from a vehicle. The electrical energy can be used when generated or stored, for example in a battery, for use at a later time.

Refrigerated vehicles or cargo conveyances, such as semi-trailers, train/railroad cars, cargo containers, barges, cargo ships, aircraft and the like, typically rely on power from a combustion engine (e.g., diesel, gasoline, etc.) to operate a refrigeration unit in order to maintain a desired temperature within the refrigerated cargo area. However, combustion engines may suffer from certain limitations or problems in that they consume fuel, generate exhaust gases and may produce noise when operating. The present invention was conceived in light of the above-mentioned problems or limitations of conventional combustion engine-powered refrigeration units, among other things.

An embodiment includes a system to generate electrical energy using mechanical energy from a vehicle to power a refrigeration unit using the generated electrical energy. For example, an electrical power generating system can include a generator that can be mounted on a vehicle, for example under a semi-trailer. The generator can be driven by wheel rotation of a wheel (or wheels) of the semi-trailer to supply electrical power to the refrigeration unit.

DETAILED DESCRIPTION

Broadly, an embodiment of the present invention generally provides a system capable of capturing kinetic energy through a component (e.g., brake drum, wheel rim, axle or the like) of a semi-trailer and converting it to electric power in order to power an electrical device such as an electrically powered refrigeration unit.

Figure 1:
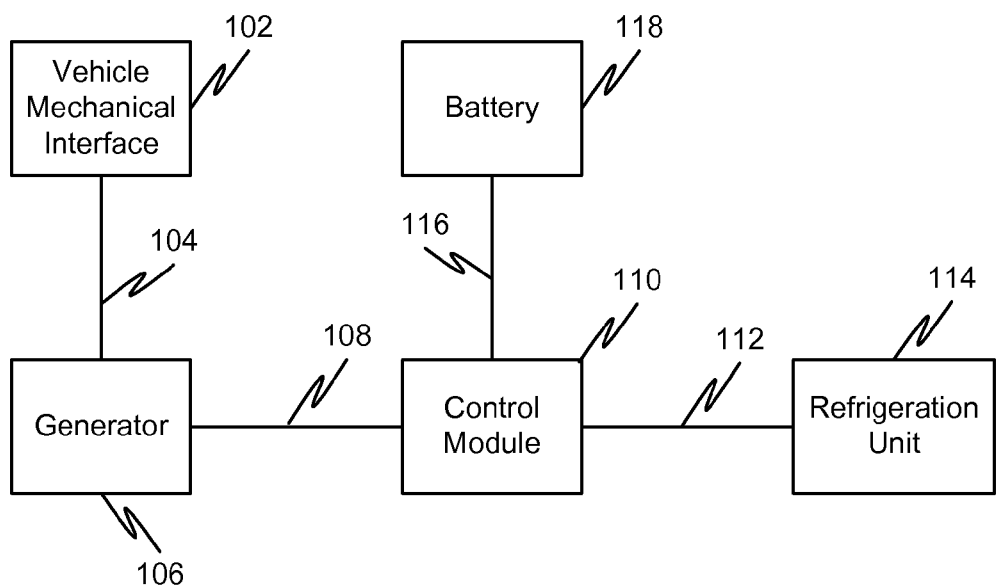
FIG. 1 is a block diagram of an exemplary embodiment of a refrigeration system in accordance with at least one embodiment.

FIG. 1 is a block diagram of an exemplary refrigeration system 100. The system 100 includes a vehicle mechanical interface 102 coupled to a generator 106 via a mechanical linkage 104. The generator 106 is connected to a control module 110 via electrical wiring 108. The control module 110 is connected to an electrically-powered refrigeration unit 114 via wiring 112. The control module 110 is also optionally connected to a battery 118 via wiring 116. The battery 118 can include one or more banks of batteries.

In operation, motion from a vehicle component, such as a wheel of a semi-trailer or railroad car, moves the vehicle mechanical interface 102, which in turn transfers motion to the generator 106 via the mechanical linkage 104 (e.g., axle). The vehicle mechanical interface 102 can include a gear system, pulley system or other suitable mechanical interface.

The control module 110 can also include an interface to provide electrical power to the truck cab for powering air conditioning, electronics and the like when the main engine of the truck is turned off. This can be advantageous in areas where regulations limit or prohibit the idling of truck engines. The electrical energy provided to the truck can come from the battery (or batteries) or from the generator when the truck is in motion.

Also, the system can include an electrical interface for charging the battery or running the refrigeration unit from an external power source such as a building electric supply or a gas or diesel stand-by generator. The electrical interface can include a retractable cord that is connected to the control module 110 on one end and has a standard plug on the other end for connecting to a building power supply outlet or a generator outlet.

Motion of the vehicle (e.g., semi-trailer or rail car) is used to drive the generator 106 and generate electrical energy, which is transferred to the control module 110 via electrical wiring 108. The control module 110 routes the electrical energy to the refrigeration unit 114, the battery 118, or both. The control module can monitor the need for power at the refrigeration unit 114 and supply electrical energy as needed. Also, the control module 110 can be configured to store any unneeded or unused electrical energy into an optional battery 118.

Figure 2:
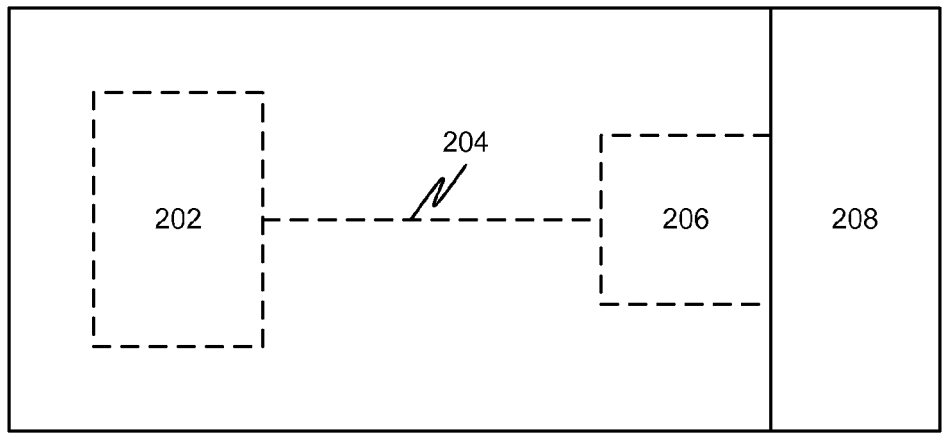
FIG. 2 is a block diagram of an exemplary embodiment of a refrigeration system for a refrigerated semi-trailer in accordance with at least one embodiment.

FIG. 2 is a block diagram of an exemplary embodiment of a refrigeration system for a refrigerated semi-trailer in accordance with the present disclosure. In particular, a refrigeration system 200 includes a generator portion 202, an electrical connection 204, a control module 206 and an electrically driven refrigeration unit 208.

Figure 3:
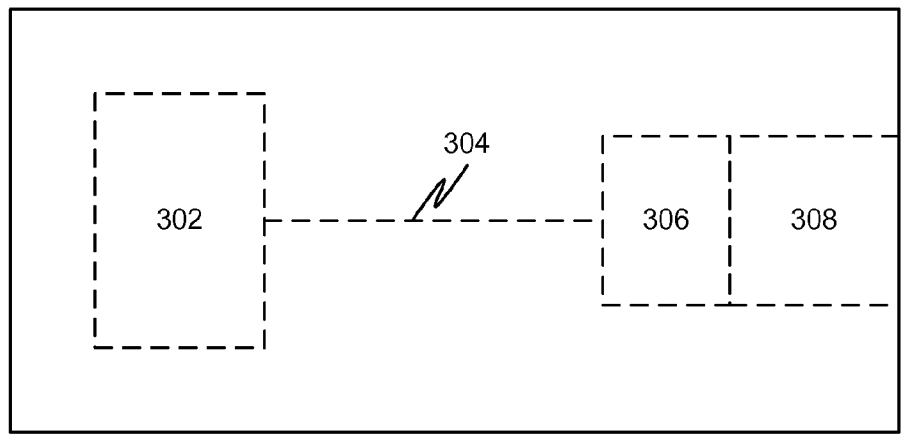
FIG. 3 is a block diagram of an exemplary embodiment of a refrigeration system for a refrigerated train car in accordance with at least one embodiment.

FIG. 3 is a block diagram of an exemplary embodiment of a refrigeration system for a refrigerated railroad car in accordance with the present disclosure. In particular, the system 300 includes a generator portion 302, electrical wiring 304, a control module 306 and an electrically-powered refrigeration unit 308.

Figure 4:
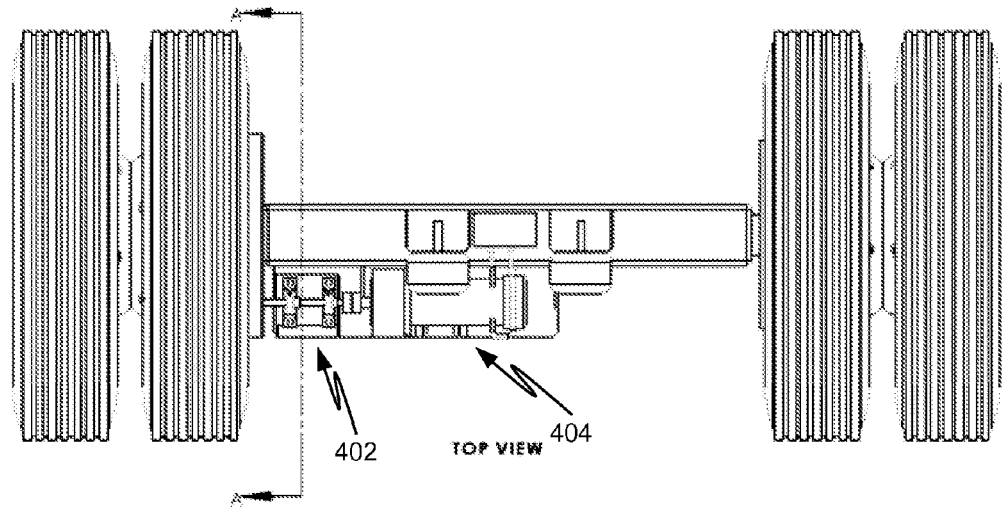
FIG. 4 is a top view of a refrigeration system generator in accordance with the present disclosure.
Figure 7:
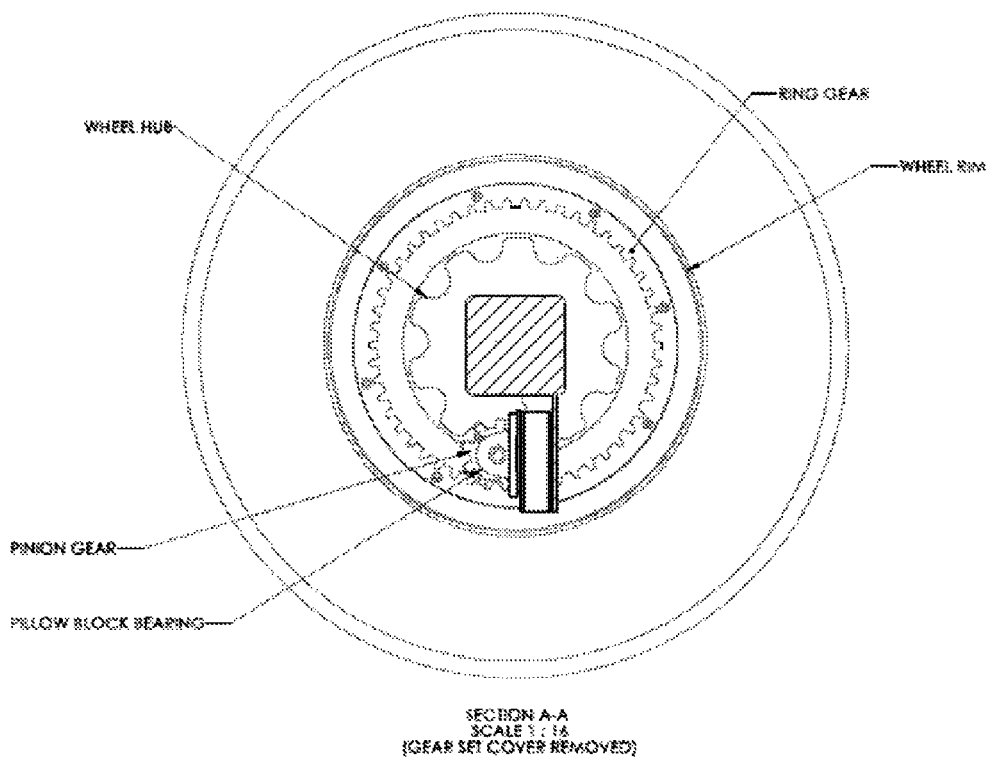
FIG. 7 is a cross-sectional view of FIG. 4 along A-A.

FIG. 4 is a top view of a refrigeration system generator showing a mechanical interface and linkage 402 and a generator 404. FIG. 7 is a cross-sectional view of FIG. 4 along A-A.

Figure 5:
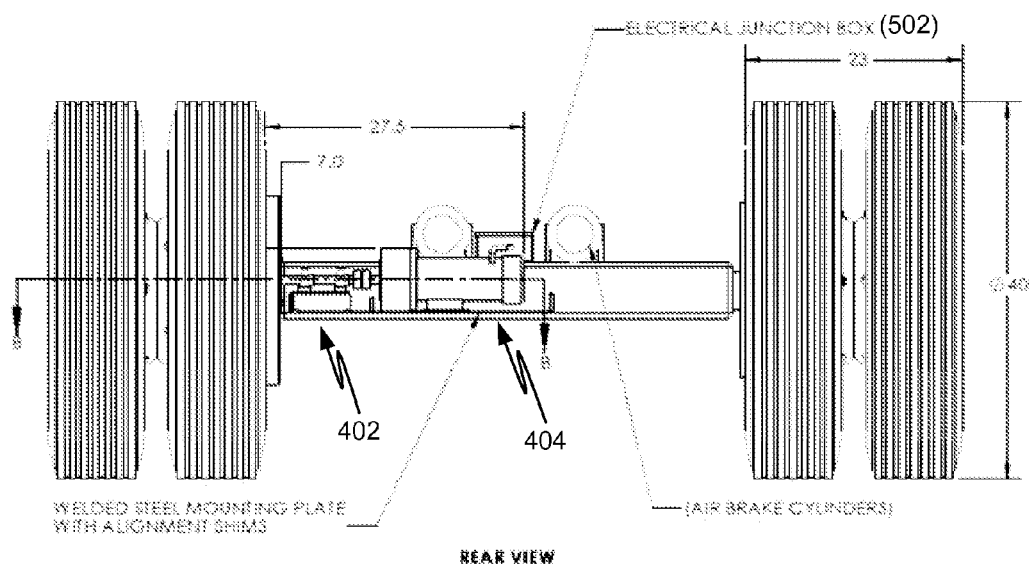
FIG. 5 is a rear view of a refrigeration system generator in accordance with at least one embodiment.
Figure 6:
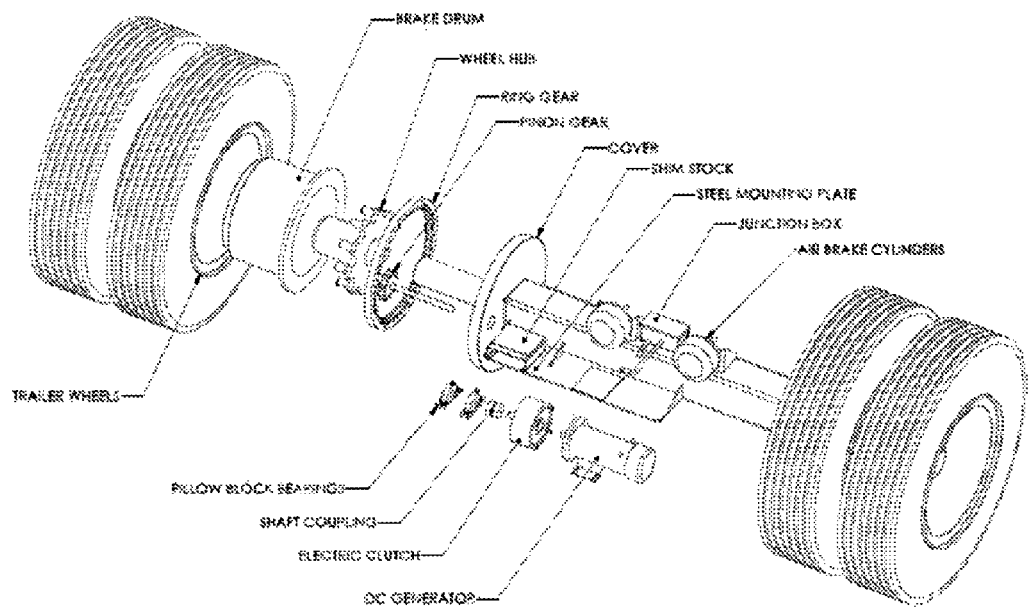
FIG. 6 is an exploded view of a refrigeration system generator in accordance with at least one embodiment.
Figure 8:
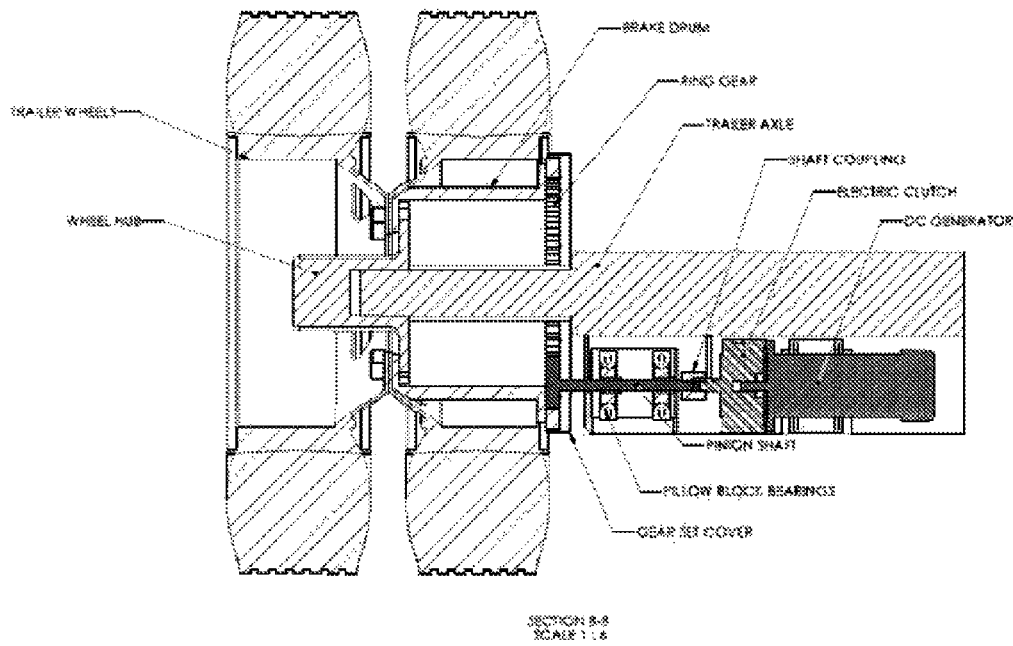
FIG. 8 is a cross-sectional view of FIG. 5 along B-B.

FIG. 5 is a rear view of a refrigeration system generator showing the mechanical interface and linkage 402, the generator 404 and an electrical junction box 502. FIG. 8 is a cross-sectional view of FIG. 5 along B-B. FIG. 6 is an exploded view of a refrigeration system generator in accordance with the present disclosure.

Referring now to FIGS. 4-8 different views of a kinetic energy converter system for powering a refrigeration unit are shown according to an exemplary embodiment of the present invention. A system may include a brake drum subassembly. The brake drum subassembly may include a geared brake drum cylinder. The geared brake drum cylinder may replace a regular brake drum cylinder of the semi trailer. The brake drum cylinder may be formed by affixing a gear ring to an inner edge of a regular brake drum cylinder, in an alternative implementation of the brake drum cylinder a "lip" may be formed by adding extra material to the inner edge of a regular brake drum cylinder during casting of the brake drum cylinder manufacturing phase. A gear may be cut into the lip to form a geared brake drum cylinder. An electrical power generator subsystem may be coupled to the brake drum cylinder via a pinion gear. The electrical power generator subsystem may include a DC generator. The DC generator may be coupled to a shaft of the pinion gear through an electric clutch and a shaft coupling. Pillow block bearings may be configured to support the shaft of the pinion gear to assure a reliable coupling between the pinion gear 16 and the gear ring.

The electrical power generator subsystem may be mounted on a steel mounting plate. The steel mounting plate may be attached to an axle. Referring now to FIG. 7, a side view of a brake drum assembly taken along the line A-A of FIG. 4 is shown.

During operation, an electric clutch may be activated. The electric clutch may lock the shaft of the pinion gear and the DC generator together. The brake drum cylinder, which may rotate with trailer wheels, may drive the DC generator. Thus the DC generator may convert the kinetic energy into electric power. The produced electrical power may be used to charge batteries and/or may run refrigerator units of the semi trailer.

The disclosed kinetic energy converter system may also be used on refrigerated train cars.

Figure 9:
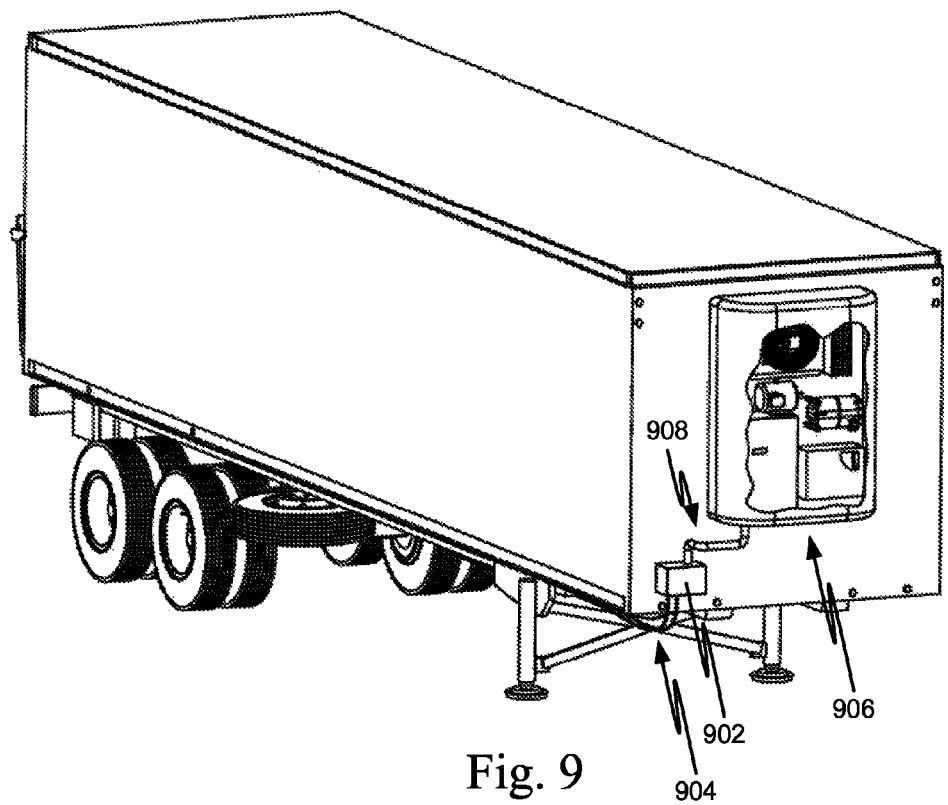
FIG. 9 is a perspective diagram of a refrigerated semi-trailer in accordance with at least one embodiment.

FIG. 9 is a perspective diagram of a refrigerated semi-truck trailer refrigeration system generator in accordance with the present disclosure. In particular, a control module 902 is connected to a generator (not shown) by wiring 904. The control module 902 is also connected to a refrigeration unit 906 via wiring 908.

An embodiment of the present invention generally can provide an electrical power generating system comprising a generator that can be mounted under a vehicle, for example a semi-trailer. The generator can be powered by axle and wheel rotation of the vehicle to provide electrical power to a refrigeration unit.

Figure 10:
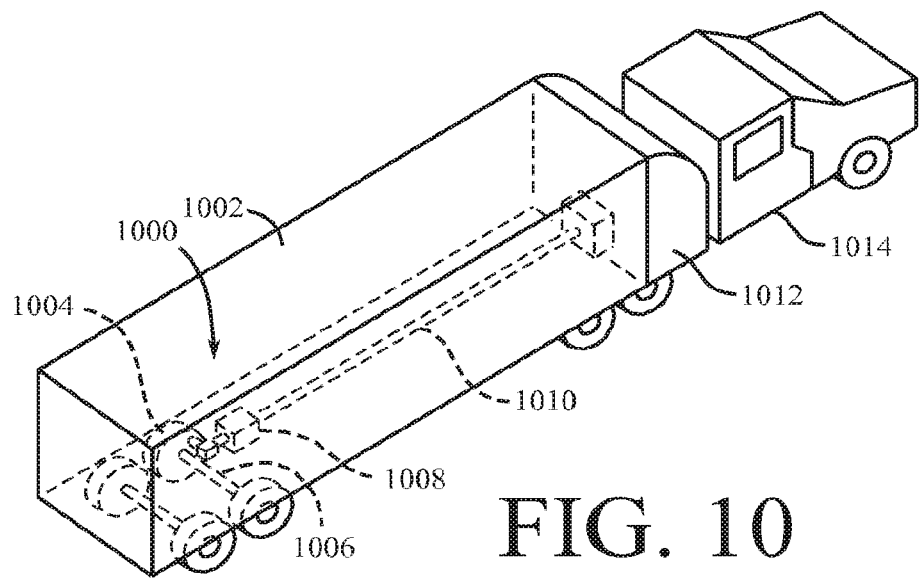
FIG. 10 is a diagram of a refrigerated semi-trailer having an exemplary refrigeration system in accordance with at least one embodiment.
Figure 11:
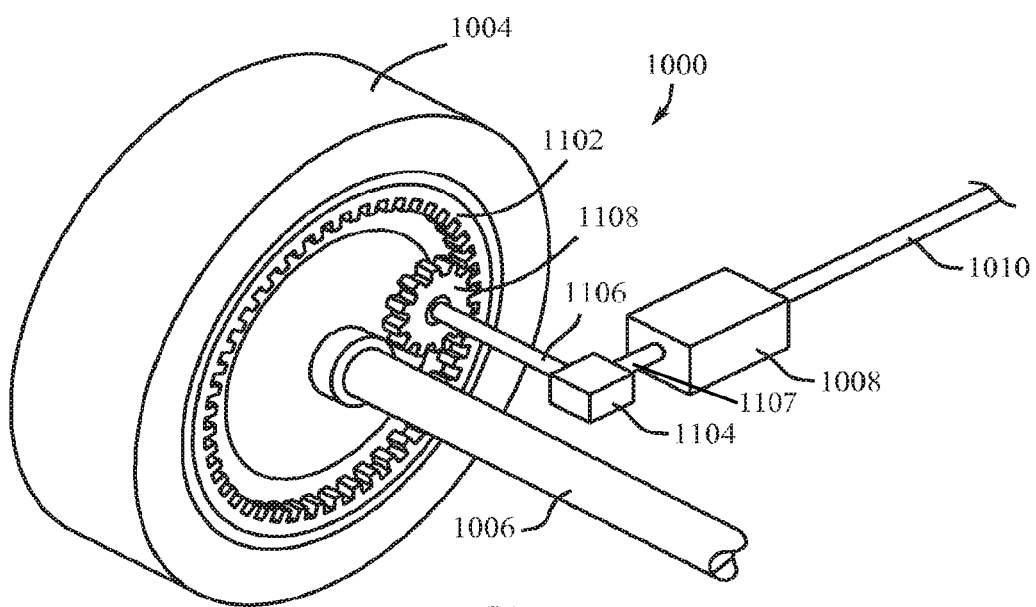
FIG. 11 is a diagram of an exemplary mechanical interface and generator portion in accordance with at least one embodiment.

According to an exemplary embodiment shown in FIGS. 10 and 11, the electrical power generating system comprises a generator 1008, a generator drive shaft 1106, a right angle gearbox/differential joint 1104, a driven gear 1108, a ring gear 1102 installed in the inner rim of a vehicle wheel 1004 and electrical grade shielded conduit wires 1010.

A power generator 1008 equal to the demand of the refrigeration unit 1012 to be powered may be installed under the trailer 1002 of a refrigerated semi-trailer truck (FIG. 10). The generator drive shaft 1106 can be attached at one end through a right angle gearbox/differential joint 1104 at the front of the power generator 1008 and at the other end to a driven gear 1108 which can engage grooves of a ring gear 1102 inside the rim of a selected inner wheel 1004 of the trailer 1002. This driven gear 1108, attached to the generator drive shaft 1106, can spin the internal components of the generator 1008 when it rotates. Therefore, as the vehicle moves and the wheel 1004 rotates, it can turn the driven gear 1108 and the generator drive shaft 1106 and power the generator 1008. The power generator 1008 can thereby produce power (e.g., electrical energy), which can be transferred to the refrigeration unit 1012 by electrical grade shielded conduit wires 1010 that can run under the truck trailer 1002 from the generator 1008 to the refrigeration unit 1012.

To build the system 1000, replace an inner wheel such as the inner wheel of the front set of wheels with a wheel 1004 having a ring gear 1102 that can match the driven gear 1108. The driven gear 1108 can be installed in the wheel 1004 between the ring gear 1102 and the wheel axle 1006. Connect the driven gear 1108 to the generator drive shaft 1106 and connect the generator drive shaft 1106 to the right angle gearbox/differential 1104 in front of the generator 1008 (FIG. 11). Another generator drive shaft 1107 (FIG. 11) has an end in communication with right angle gearbox 1104 located opposite an end in communication with driven gear 1108. FIG. 11 best illustrates right angle gearbox 1104 positioning the first generator drive shaft 1107 at a perpendicular orientation to the second generator drive shaft 1106. The output power cables 1010 can be placed from the generator 1008 to the refrigeration unit 1012 using electrical conduit protected wire.

Refrigerated semi-trailer trucks may rely on diesel power from the engine to power the refrigeration unit 1012, which is located at the front of the semi-trailer 1002 behind the cab 1014 of the truck. An embodiment can reduce or eliminate the dependence on diesel fuel for refrigeration power. The motion of the rear wheels in conjunction with an on-board generator 1008 can supply the power instead.

The system can be designed to fit smaller vehicles such as battery powered cars and trucks, to recharge the vehicles while in motion, eliminating the need to recharge the vehicle while stationary.

An embodiment can be built as part of a new refrigerated vehicle, or provided as a retrofit kit for an existing refrigerated vehicle or cargo conveyance having a different type of refrigeration unit, e.g., a combustion engine refrigeration unit.

It will be appreciated that the figures and examples described above are for purposes of illustrating and explaining principles, features and exemplary embodiments of the present invention and are not intended to be limiting. In particular, other mechanical and electrical connections between the different components and configurations of components could be used. Also, any dimensions shown are exemplary for illustration purposes.

In addition to being configured as a system to power a refrigeration unit solely from electrical power, an embodiment can be configured as a hybrid system in which a combustion engine is supplemented by an electrical generation system as described herein. Such a hybrid system may use the combustion engine to generate electrical energy when the vehicle is not in motion, or may use the combustion engine to power the refrigeration unit when the electrical motor is not powering the refrigeration unit.

While embodiments have been described in terms of semi-trailers and railroad cars, it will be appreciated that an embodiment can be used with any refrigerated vehicle or cargo conveyance in which mechanical energy is available to power an electrical generator. Refrigerated vehicles or cargo conveyances can include, but not be limited to, cargo ships, aircraft, watercraft, cars, trucks, vans, or the like.

Also, it will be appreciated that, while the examples discussed above are in terms of refrigeration, the same principles would apply to a system for vehicles or cargo conveyances in which other environmental factors need to be maintained, such as heat, ventilation, humidity, pressure or the like.

Further, while the above examples have been described in terms of cargo conveyances, an embodiment can be used to power heating, cooling, ventilation or other environmental systems for passenger vehicles and conveyances.

It will be appreciated that the control modules, processes, systems, and sections described above can be implemented in hardware, hardware programmed by software, software instructions stored on a nontransitory computer readable medium or a combination of the above. A system for controlling the power generation, distribution and operation of a refrigeration unit, for example, can include using a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, or another structured or object-oriented programming language. The sequence of programmed instructions and data associated therewith can be stored in a nontransitory computer-readable medium such as a computer memory or storage device which may be any suitable memory apparatus, including, but not limited to, ROM, PROM, EEPROM, RAM, flash memory, magnetic disk drives, optical disk drives and the like.

Furthermore, the modules, processes systems, and sections can be implemented as a single processor or as a distributed processor. Further, it should be appreciated that the steps mentioned above may be performed on a single or distributed processor (single and/or multi-core). Also, the processes, system components, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The control modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the control method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed control method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the database and/or computer programming arts.

Moreover, embodiments of the disclosed control method, system, and computer program product can be implemented in software executed on a programmed general purpose computer, a special purpose computer, a microprocessor, or the like.

It is, therefore, apparent that there is provided, in accordance with the various embodiments disclosed herein, a refrigeration system.

While the invention has been described in conjunction with a number of embodiments, it is evident that many alternatives, modifications and variations would be or are apparent to those of ordinary skill in the applicable arts. Accordingly, Applicant intends to embrace all such alternatives, modifications, equivalents and variations that are within the spirit and scope of the invention.

What is claimed is:

1. An electrical generating system for a trailer configured to be towed, comprising:
    a generator;
    a first drive shaft having a first end located opposite a second end, said first end of said first drive shaft is configured to drive said generator, said second end of said first drive shaft is connected to a first gear;
    a second drive shaft having a first end located opposite a second end, said first end of said second drive shaft is connected to a second gear;
    said first gear is configured to engage said second gear, whereby, said first gear and said second gear are contained within a gearbox, whereby, said gearbox positions said first drive shaft at a perpendicular orientation to said second drive shaft; and,
    said second end of said second drive shaft is connected to a third gear, said third gear is configured to engage a ring gear, said ring gear is connected to a rim, whereby, a rotational force of said rim causes said generator to rotate, said rotation of said generator causing said generator to generate an electrical current.

2. The electrical generating system for a trailer configured to be towed of claim 1, wherein said generator is in electrical communication with a refrigeration unit.

* * * * *